US005514755A

United States Patent [19]

Fenn et al.

[11] Patent Number: 5,514,755
[45] Date of Patent: May 7, 1996

[54] COATING COMPOSITIONS COMPRISING ISOBORNYL METHACRYLATE AND 4-HYDROXYBUTYL ACRYLATE

[75] Inventors: David R. Fenn, Burnham; Victoria L. Hughes, Slough, both of England

[73] Assignee: Imperial Chemical Industries PLC, London, England

[21] Appl. No.: 413,621

[22] Filed: Mar. 30, 1995

[30] Foreign Application Priority Data

Apr. 6, 1994 [GB] United Kingdom .................. 9406815

[51] Int. Cl.6 ..................................................... C08L 35/02
[52] U.S. Cl. ................... 525/329.5; 525/123; 525/328.8; 525/350; 525/375; 525/381; 525/386; 525/396; 525/125; 526/309
[58] Field of Search ..................................... 525/125, 123, 525/350, 375, 396, 329.5; 328.8; 526/309

[56] References Cited

U.S. PATENT DOCUMENTS

| 4,675,358 | 6/1987 | Frangou | 524/439 |
|---|---|---|---|
| 4,753,825 | 6/1988 | Linden | 427/340 |
| 4,892,906 | 1/1990 | Pham | 524/730 |
| 5,279,862 | 1/1994 | Corcoran | 427/407.1 |
| 5,286,782 | 2/1994 | Lamb | 524/507 |
| 5,288,828 | 2/1994 | Harris | 526/320 |
| 5,314,953 | 5/1994 | Corcoran | 525/123 |

*Primary Examiner*—Fred Zitomer
*Attorney, Agent, or Firm*—Thomas M. Schmitz

[57] ABSTRACT

A hydroxyl functional acrylic addition polymer, useful in producing refinish compositions having a good balance of solids at a given viscosity and final film hardness, which comprises units derived from isobornyl methacrylate and units derived from 4-hydroxybutyl acrylate.

8 Claims, No Drawings

COATING COMPOSITIONS COMPRISING ISOBORNYL METHACRYLATE AND 4-HYDROXYBUTYL ACRYLATE

This invention relates to a hydroxyl functional polymer having units derived from isobornyl methacrylate and from 4-hydroxybutyl acrylate and to coating compositions comprising the polymer and a crosslinker in an organic solvent. It also relates to processes for producing the polymer and the compositions, to a process of coating using the compositions and to a coated substrate obtainable by the coating process.

Coatings used for the original painting of motor vehicles and for their repair are required to have very good physical properties such as hardness and resistance to water and solvents. The coating compositions are also required to have good application and appearance properties so that they are easy to apply to a substrate using spray application and result in final films having good gloss.

One class of coating compositions commonly used for these applications comprise a hydroxyl functional acrylic addition polymer and a crosslinker in an organic solvent. The crosslinker can be for example a polyisocyanate or a melamine formaldehyde resin. The compositions are applied as a layer to the surface of a substrate and either left to dry and cure at room temperature or else heated to initiate or speed the drying and curing process. During drying and curing the solvent evaporates and the polymer and crosslinker react together so as to produce a crosslinked coating film.

Due to environmental considerations there is a general trend in the coatings industry towards coating compositions with reduced organic solvent content. Coatings with a lower organic solvent content emit lower levels of solvent when they are used and so are less polluting of the atmosphere.

One way to achieve a lower solvent content is to use so-called High-Solids compositions. High-solids compositions are solventborne compositions which contain a relatively high level of non-volatile materials such as film-forming polymer, pigments and fillers, and a relatively low level of organic solvent.

A problem with formulating high solids coating compositions suitable for use in painting motor vehicles is that the compositions can have an unacceptably high viscosity. This is because the film forming polymers traditionally used in this field have a high solution viscosity in high solids solutions. The high viscosity gives rise to problems in spray application with poor paint atomization, and poor flow out and consequent low gloss levels and poor appearance. In practice, these types of composition are formulated to a given viscosity, to enable consistent spraying, and this puts a limit on the solids content. It is usually the case that even a one or two percent increase in the solids content results in unacceptable viscosities.

One way around the viscosity/solids problem is to use lower molecular weight film-forming polymers. Generally, the lower the molecular weight of a solution polymer, the lower is its solution viscosity. This means that the use of a lower molecular weight polymer generally allows a higher solids content for a given viscosity. However, the use of lower molecular weight polymers gives rise to further problems.

The resulting final coating films are soft and mark easily, particularly in the first week or so after application. The dust free and print free times of the films (i.e. the length of time after application when dust no longer adheres to the surface and when finger prints no longer remain in the surface when it is pressed) are also unacceptably long. Soft and easily marked coatings are clearly unacceptable for high performance motor vehicle topcoats.

Compositions known hitherto have generally been a poor compromise between the solids content of the compositions and the molecular weight of the acrylic polymers. In order to achieve a given viscosity, these known compositions either have a lower than ideal solids content, give rather soft films or suffer in varying degrees from both of these problems.

U.S. Pat. No. 4,605,719 discloses high solids coating compositions comprising an acrylic polymer and a crosslinker. The acrylic polymer contains units derived from a polycyclic monomer such as isobornyl methacrylate. We have found that while the inclusion of isobornyl methacrylate in the polymer allows a slightly higher solids content in these type of compositions for a given viscosity, it gives little or no improvement in hardness and somewhat soft films result.

There are several general disclosures of the use of 4-hydroxy butyl acrylate in the manufacture of acrylic polymers, including British patents GB 1 524 613 and GB 1 515 868 and U.S. Pat. Nos. 4,741,932, 3,671,293 and 4,413,036. We have found the inclusion of 4-hydroxybutyl acrylate has, in itself, very little impact on either the achievable solids content of the compositions at a given viscosity or the hardness of the final films.

There is a problem therefore in producing coating compositions which both have an acceptable level of solids content at a given viscosity and which produce hard films.

Surprisingly we have discovered the use of a polymer derived at least partly from a combination of both isobornyl methacrylate and 4-hydroxybutyl acrylate can give compositions which partly or fully solve this problem.

According to the present invention there is provided a hydroxyl functional acrylic addition polymer which comprises units derived from isobornyl methacrylate and units derived from 4-hydroxybutyl acrylate.

The hydroxyl functional acrylic addition polymer is derived from polymerisable ethylenically unsaturated monomers such as vinyl or acrylic monomers. The polymer comprises units derived from hydroxybutyl acrylate, units derived from isobornyl methacrylate and optionally comprises other functional units and other structural units.

Preferably, the acrylic addition polymer comprises between 2 and 50% by weight of units derived from isobornyl methacrylate based on the weight of the polymer, more preferably 10 to 40% by weight and most preferably 20 to 30% by weight.

Preferably the acrylic addition polymer comprises 10 to 50% by weight of units derived from 4-hydroxybutyl acrylate, more preferably 20 to 40% by weight and most preferably 24 to 36% by weight.

When used herein, the term acrylic monomer refers to esters of acrylic or methacrylic acid. The term (meth) acrylate refers to both the acrylate and methacrylate equally and the term (meth)acrylic acid refers to acrylic or methacrylic acid equally.

Other functional units are derived from hydroxyl functional vinyl or acrylic monomers other than 4-hydroxybutyl acrylate. An example of a hydroxyl functional vinyl monomer is vinyl alcohol. Examples of hydroxyl functional acrylic monomers are hydroxyethyl (meth)acrylate, and hydroxypropyl (meth)acrylate.

Other examples of suitable hydroxyl functional acrylic monomers are the reaction products of glycidyl (meth) acrylate with mono-carboxylic acids, such as versatic acid and the reaction product of (meth) acrylic acid with monoepoxy compounds such as Cardura E (the glycidyl ester of versatic acid; trade mark of Shell).

Other structural units are derived from monomers other than isobornyl methacrylate which are non-functional, that is they do not have any functional groups which will react with the crosslinker. Examples of non-functional monomers are alkyl esters of (meth)acrylic acid and non-functional vinyl monomers.

Examples of suitable alkyl esters of (meth)acrylic acid are $C_{1-12}$ alkyl esters such as methyl (meth)acrylate, ethyl (meth)acrylate, n-butyl (meth) acrylate, t-butyl (meth)acrylate, and n-propyl (meth) acrylate. Examples of non-functional vinyl monomers are styrene and alpha-methyl styrene.

One particularly preferred other structural unit is derived from alpha-methyl styrene. It has been found that compositions containing a polymer having units derived form alpha methyl styrene have a particularly good balance of solids content at a given viscosity and final film hardness.

Preferred polymers comprise 5 to 50% by weight of alpha-methyl styrene based on the total weight of the polymer, more preferably 15 to 30%, most preferably 18 to 25%.

It is also possible to include certain monomers which carry groups other than hydroxyl groups, such as carboxylic acid groups, amine groups and epoxy groups. An example of a monomer carrying a carboxylic acid group is (meth) acrylic acid. An example of a monomer carrying an amine groups is tertiary butyl aminoethyl (meth) acrylate. An example of a monomer carrying a glycidyl group is glycidyl (meth) acrylate.

It is also possible to react certain functional groups with other compound so as to modify the polymer. For example, acid groups on the polymer can be reacted with glycidyl functional compounds such as the glycidyl ester of a tertiary carboxylic acid, for example a $C_{8-12}$ carboxylic acid such as versatic acid (available as Cardura E from Shell). Epoxy groups on the polymer can be reacted with an acid functional compound for example a tertiary carboxylic acid such as versatic acid.

The acrylic addition polymers can also comprise units derived from chain transfer agents. Chain transfer agents are compounds which are used in the manufacture of acrylic addition polymers to control their molecular weight. Examples of known chain terminating agents include mercapto functional compounds. Examples of suitable mercapto functional compounds are alkyl mercaptans, such as primary octyl mercaptan, hydroxyalkyl mercaptans, such as mercaptoethanol and mercaptoalkanoic acids such as mercaptopropionic acid.

A particularly preferred class of chain transfer agents are mercapto alkanoic acids. A particularly preferred mercaptoalkanoic acid is mercapto propionic acid.

Preferred acrylic addition polymers comprise between 0.5 and 5% by weight of units derived from mercapto alkanoic acid based on the total weight of the polymer, more preferably 1 to 5% by weight and most preferably 2 to 3% by weight.

Units derived from mercapto alkanoic acids give rise to acid groups on the polymer and it is preferred that these acid groups are reacted with a glycidyl functional compound. Suitable glycidyl functional compounds are glycidyl esters of a tertiary aliphatic carboxylic acids, particularly $C_{8-12}$ tertiary carboxylic acids such as Cardura E. It has been found that polymers according to the present invention which comprise units derived from mercapto alkanoic acids in which the acid group has been reacted with the glycidyl ester of a tertiary aliphatic carboxylic acid have the additional benefit of having an unexpectedly long potlife when used in coating compositions with poly-isocyanate crosslinkers.

Preferred acrylic addition polymers have a number average molecular weight as measured by gel permeation chromatography of 700 to 10,000, more preferably 1,000 to 4,000, most preferably 1,500 to 2,500.

Preferred acrylic addition polymers have a theoretical glass transition temperature (Fox Tg) of 0° to 80° C., more preferably 20° to 70° C.

Preferably the acrylic addition polymer has a hydroxyl value of 5 to 500, more preferably 50 to 250.

The polymers are particularly useful in coating compositions. According to the present invention there is provided a coating composition comprising a solution in a volatile organic solvent of;

i) a hydroxyl functional acrylic addition polymer as described above, and ii) a crosslinker for the polymer, Preferably the compositions contain less than 500 g/l of volatile organic solvent based on the total composition, more preferably less than 480 g/l and most preferably less than 420 g/l.

The volatile organic solvent can be any solvent which will dissolve the hydroxyl functional polymer and the crosslinker. It can be an aliphatic or aromatic hydrocarbon such as Solvesso 100 (trademark), toluene or xylene, an alcohol such as butanol or isopropanol, an ester such as butyl acetate or ethyl acetate, a ketone such as acetone, methyl isobutyl ketone or methyl ethyl ketone, an ether, an etheralcohol or an ether-ester or a mixture of any of these.

The crosslinker is a compound which will react with at least two hydroxyl groups. Examples of suitable crosslinkers are melamine formaldehydes resins and polyisocyanates.

Melamine formaldehyde resins are well known in the coating art. They are the product of the reaction of melamine and formaldehyde. Examples of commercially available melamine formaldehydes are partially and fully alkylated melamines such as partially methylated melamines and hexamethoxy methyl melamine.

Polyisocyanates are also well known in the coatings art. Poly isocyanates are compounds having two or more isocyanate groups per molecule.

Suitable diisocyanates are aliphatic or aromatic diisocyanates. Examples of suitable aliphatic diisocyanates are hexamethylene diisocyanate and isophorone diisocyanate. Examples of suitable aromatic diisocyanates are toluene diisocyanate and 4,4'-diphenylmethane diisocyanate.

Other suitable polyisocyanates include the isocyanurate trimers, allophanates and uretdiones of diisocyanates such as those described above as well as the reaction products of these diisocyanates with polyols. Polyols are compounds having three or more hydroxyl groups. Suitable polyols include trimethylol propane, glycerol and pentaerithritol. Many such poly isocyanates are commercially available, for example under the Desmodur trade mark from Bayer and under the Tolonate trade mark from Rhone Poulenc.

Polyisocyanate crosslinkers are preferably used in an amount such that the ratio of isocyanate groups on the polyisocyanate to the number of hydroxyl groups on the polymer is in the range 0.8 to 1.4, more preferably 0.9 to 1.1.

The compositions can also contain catalysts for the isocyanate-hydroxyl reaction. Suitable catalysts include tin catalysts such as dibutyl tin dilaurate and amine catalysts such as triethylamine.

The compositions can also contain other conventional paint additives such as reactive diluents, pigments, fillers, UV absorbers and flow aids.

The compositions can be made by dissolving the components in the organic solvent in any order. Generally, when the crosslinker is an unblocked polyisocyanate then the composition is preferably made by adding the polyisocyanate, optionally as a solution in an organic solvent, to the other components shortly before use. This reduces problems with the potlife of these compositions.

The hydroxyl functional polymer can be produced by conventional means, for example, it can be produced by contacting a mixture of the appropriate monomers including any chain transfer agent with a polymerisation initiator at a temperature at which polymerisation occurs. For example the monomer mixture can be slowly fed into a solution of initiator held at the polymerisation temperature or the initiator can be fed into a solvent at the polymerisation temperature simultaneously with the monomer mixture. Suitable solvents are those mentioned above in relation to the coating composition.

Suitable initiators are azo initiators such as 2,2' azobis (2-methylbutyronitrile) or peroxy initiators such as benzoyl peroxide or butylperoxy-2-ethyl hexanoate.

When acid groups on the polymer are to be reacted with a glycidyl ester of a tertiary carboxylic acid, the reaction can be carried out either simultaneously with the polymerisation of the monomers or in a separate step. When the reaction is carried out simultaneously with the polymerisation of the monomers, the glycidyl ester can simply be added into the reaction mixture. When the reaction is carried out in a separate step, the polymer and the glycidyl ester can be heated together in a suitable solvent, such as those mentioned above in relation to the coating composition.

The coating composition of the invention can be applied as a layer to the surface of a substrate and then allowed or caused to dry and cure. According to the present invention there is provided a process for coating a substrate which comprises the steps of applying a layer of a coating composition according to the present invention to a surface of a substrate and thereafter causing or allowing the layer to cure.

The coating composition can be applied by conventional means such as brushing, rollercoating or spraying, preferably by spraying.

The substrate can be any suitable material such as metal, plastic or glass and can be previously painted with a primer or undercoat. The compositions are particularly suitable for the refinishing of motor vehicles.

The applied layer can be allowed to cure at ambient temperature in the case where the hydroxyl polymer and crosslinker react together at ambient temperatures. This is generally the case for example when the crosslinker is a polyisocyanate.

Alternatively the layer can be baked at elevated temperatures, for example 50°–120° C., either to accelerate curing or to cause curing when the crosslinker will only react with the hydroxyl functional polymer at elevated temperatures. This is generally the case when the crosslinker is a blocked polyisocyanate or a melamine formaldehyde.

According to the present invention there is also provided a coated article obtainable by the process.

The invention will now be illustrated by means of the following examples.

EXAMPLES

1. Preparation of Hydroxyl Functional Acrylic Addition Polymers

Addition polymers were produced according to the following general method and using the monomers in Table 1.

Methyl isoamyl ketone (see Table 1) was heated to reflux temperature (about 145° C.) with stirring under nitrogen.

The monomer solution given in Table 1 was added slowly to the refluxing mixture over a period of 3 hours. Trigonox 21s (butyl peroxy-2-ethyl hexanoate, trade mark of Akzo, see Table 1) was added and the mixture was stirred at reflux temperature for a further hour. A further identical quantity of Trigonox 21s (see Table 1) was added, the mixture was stirred at reflux temperature for a further hour and the mixture was allowed to cool to room temperature.

The resulting hydroxyl functional acrylic addition polymers all had a calculated glass transition temperature (Fox Tg) of 40° C., a hydroxyl functionality of 2 mols/kg corresponding to a hydroxyl value of 112 mgKOH/g based on non-volatile content and had a non-volatile content of 70%.

In the Table the following abbreviations are used;
MIAK=Methyl isoamyl Ketone
IBoMA=Isobornyl methacrylate
BA=n-Butyl acrylate
tBA=Tertiary butyl acrylate
HBA=4-hydroxybutyl acrylate.
HEMA=Hydroxy ethyl methacrylate
ST=Styrene
AMST=Alpha methyl styrene
pOM Primary octyl mercaptan
MPA=Mercapto propionic acid
Vazo 67=2,2-azobis (2-methylbutyronitrile); dupont trade mark

TABLE 1

| Polymer | All weights given in g. | | | | | |
|---|---|---|---|---|---|---|
| | 1 | 2 | 3 | 4 | 5 | 6 |
| MIAK Monomer Solution | 635.9 | 624.8 | 612.9 | 635.9 | 625.9 | 612.9 |
| BA | 451.0 | 443.1 | 434.8 | 42.27 | 41.61 | 40.75 |
| MMA | 641.5 | 630.3 | 618.4 | 993.5 | 978.0 | 957.7 |
| ST | 404.6 | 397.5 | 390.0 | 404.6 | 398.3 | 390.0 |
| HBA | | | | 582.7 | 573.6 | 561.7 |
| HEMA | 526.0 | 516.8 | 507.0 | | | |
| pOM | 20.24 | 69.55 | 97.50 | 20.24 | 69.69 | 97.50 |
| Vazo 67 | 91.03 | 89.44 | 97.50 | 91.03 | 89.61 | 97.50 |
| MIAK | 222.5 | 221.6 | 235.0 | 222.5 | 216.2 | 235.0 |
| Trigonox 21s (each addition) | 3.540 | 3.478 | 3.412 | 3.596 | 3.485 | 3.412 |
| Molecular Weight | 2522 | 1901 | 1449 | 2470 | 1988 | 1457 |
| Polymer | 7 | 8 | 9 | 10 | 11 | 12 |
| MIAK Monomer Solution | 313.9 | 310.2 | 304.5 | 317.9 | 312.7 | 307.1 |
| IBoMA | 267.1 | 263.9 | 259.0 | 414.7 | 407.8 | 400.6 |
| BA | 277.6 | 274.3 | 269.2 | 103.2 | 101.5 | 99.6 |
| ST | 201.7 | 199.3 | 195.6 | 102.3 | 198.9 | 195.4 |
| HBA | | | | 291.3 | 286.9 | 281.4 |
| HEMA | 262.2 | 259.2 | 254.3 | | | |
| pOM | 10.08 | 28.96 | 49.49 | 10.12 | 34.82 | 48.84 |
| Vazo 67 | 45.38 | 43.45 | 49.49 | 45.52 | 44.76 | 48.84 |
| MIAK | 118.5 | 117.1 | 114.9 | 111.3 | 109.9 | 114.8 |
| Triganox 21s (each addition) | 1.765 | 1.745 | 1.712 | 1.77 | 1.741 | 1.71 |
| Molecular Weight | 2484 | 1990 | 1600 | 2329 | 1850 | 1328 |

Polymers 1 to 3 are comparative and represent typical known hydroxy functional acrylic addition polymers. The monomer compositions are the same in each of polymers 1 to 3 but the molecular weights have been varied by use of different amounts of initiator and chain transfer agent.

Polymers 4 to 6 are comparative. They are similar to polymers 1 to 3 but contain units derived from 4-hydroxybutyl acrylate instead of hydroxy ethyl methacrylate. The amounts of the other monomers have been altered so as to keep the same glass transition temperature.

Polymers 7 to 9 are comparative. They are similar to polymers 1 to 3 except that they contain units derived from isobornyl methacrylate instead of methyl methacrylate. The amounts of the other monomers have been altered to maintain the same glass transition temperature.

Polymers 10 to 12 are according to the invention. They are similar to polymers 1 to 3 except that they contain both units derived from 4-hydroxy butyl acrylate and from isobornyl methacrylate.

The molecular weights of polymers 1 to 12 are the number average molecular weights as measured by gel permeation chromatography.

2. Coating Compositions and Testing

Coating compositions were prepared using the following general method. The components are detailed in Table 2 below.

Components A and B (see Table 2) were made up individually and then mixed together. The viscosity of the composition was adjusted to a BS B4 cup viscosity of 25 seconds at 25° C. by addition of n-butyl acetate.

A solids determination was carried out on the fresh mixture by accurately weighing about 0.3 g of the mixture onto an aluminium dish which was then stoved in an oven at 110° C. for 1 hour. The solids content was the final weight of the sample divided by its initial weight.

The mixture was applied as a film onto a glass substrate using a 175 micron block spreader and allowed to dry at ambient temperature overnight. After 24 hours the resulting films were tested for hardness using a Leitz (trade mark) Knoop Hardness tester.

The solids results and the hardness results are given in Table 3. These results are also shown on graphs 1 to 3. Graph 1 shows the effects on solids and hardness of using 4-hydroxbutyl acrylate in polymers 4 to 6 as compared to the standard compositions containing polymers 1 to 3. Graph 2 shows the effect of using isobornyl methacrylate in polymers 7 to 9 as compared to polymers 1 to 3. Graph 3 shows the surprisingly large improvement obtained by using a combination of both 4-hydroxybutyl acrylate and isobornyl methacrylate in the polymer.

TABLE 2

All weights given in g.

| Compo-sition | Component A Polymer No. (weight) | DBTDL | Solvent | Component B HDT90 | Solvent |
|---|---|---|---|---|---|
| 1 | 1 (94.12) | 0.38 | 13.73 | 28.05 | 13.73 |
| 2 | 2 (90.95) | 0.38 | 15.31 | 28.05 | 15.31 |
| 3 | 3 (94.39) | 0.38 | 13.59 | 28.05 | 13.59 |
| 4 | 4 (94.39) | 0.38 | 13.59 | 28.05 | 13.59 |
| 5 | 5 (92.51) | 0.38 | 14.53 | 28.05 | 14.53 |
| 6 | 6 (95.79) | 0.38 | 12.89 | 28.05 | 12.89 |
| 7 | 7 (90.57) | 0.38 | 15.50 | 28.05 | 15.5 |
| 8 | 8 (93.17) | 0.38 | 14.2 | 28.05 | 14.20 |
| 9 | 9 (95.51) | 0.38 | 13.03 | 28.05 | 13.03 |
| 10 | 10 (92.77) | 0.38 | 14.40 | 28.05 | 14.40 |
| 11 | 11 (93.85) | 0.38 | 13.86 | 28.05 | 13.86 |
| 12 | 12 (90.95) | 0.38 | 15.31 | 28.05 | 15.31 |

HDT 90 is Tolonate HDT 90 (trade mark of Rhone Poulenc), believed to be the isocyanurate trimer of hexamethylene diisocyanate.

TABLE 2-continued

All weights given in g.

| Compo-sition | Component A Polymer No. (weight) | DBTDL | Solvent | Component B HDT90 | Solvent |
|---|---|---|---|---|---|

DBTDL is a 2% by weight solution of dibutyl tin dilaurate in butyl acetate. Solvent is butyl acetate.

TABLE 3

| Composition | Solids Content (%) | Hardness (Knoop) |
|---|---|---|
| 1 | 54.5 | 0.58 |
| 2 | 57.5 | 0.50 |
| 3 | 58.7 | 0.42 |
| 4 | 53.7 | 0.66 |
| 5 | 56.2 | 0.57 |
| 6 | 58.6 | 0.48 |
| 7 | 57.2 | 0.80 |
| 8 | 60.1 | 0.49 |
| 9 | 60.7 | 0.25 |
| 10 | 59.6 | 1.44 |
| 11 | 60.4 | 0.93 |
| 12 | 62.0 | 0.61 |

The above results clearly show the unexpectedly large benefit derived from the use of a combination of 4-hydroxybutyl acrylate and isobornyl methacrylate when compared with the use of 4-hydroxybutyl acrylate alone or with the use of isobornyl methacrylate alone.

3. Hydroxyl Functional Acrylic Addition Polymers 13 to 19.

Hydroxyl functional addition polymers 13 to 19 according to the invention were made according to the following general method. The amounts of the components are given in Table 4 below.

Solvent 1 was heated to reflux temperature (about 145° C.) with stirring under nitrogen. A mixture of the monomers, initiator 1, chain transfer agent and solvent 2 was added slowly over a period of 3 hours at reflux temperature. Initiator 2 was added and the mixture was stirred at reflux temperature for a further hour. A further identical quantity of Initiator 2 was added, the mixture was stirred at reflux temperature for a further hour and the mixture was allowed to cool to room temperature.

TABLE 4

| | | Polymer 13 | 14 | 15 |
|---|---|---|---|---|
| Solvent 1 | MIAK | 303.5 | 313.0 | 313.9 |
| Monomers | IBoMA | 364.25 | 408.3 | 377.2 |
| | BA | 109.03 | 101.6 | 139.2 |
| | HBA | 254.6 | 286.8 | 290.5 |
| | AA | 0.301 | 0.0 | 0.0 |
| | Card | 80.13 | 0.0 | 0.0 |
| | AMST | 202.69 | 0.0 | 201.7 |
| | ST | 0.0 | 199.2 | 0.0 |
| Initiator 1 | Vazo 67 | 45.47 | 44.8 | 45.4 |
| Chain transfer agent | MPA | 22.0 | 0.0 | 0.0 |
| | pOM | 0.0 | 34.9 | 10.1 |
| Solvent 2 | MIAK | 114.6 | 108.1 | 118.5 |
| | BuAc | 0.0 | 0.0 | 0.0 |
| Initiator 2 | Trig (each addition) | 1.71 | 1.7 | 1.8 |

TABLE 4-continued

| | | Polymer | | |
|---|---|---|---|---|
| | | 16 | 17 | 18 |
| Solvent 1 | BuAc | 316.1 | 320.0 | 314.3 |
| | Solvesso | 316.1 | 320.0 | 314.3 |
| Monomers | IBoMA | 432.2 | 563.2 | 559.0 |
| | HBA | 362.1 | 509.8 | 506.1 |
| | AA | 199.0 | 36.2 | 0.0 |
| | MAA | 0.0 | 0.0 | 7.2 |
| | Card | 616.1 | 125.0 | 124.0 |
| | ST | 402.3 | 0.0 | 400.0 |
| | MMA | 0.0 | 392.8 | 0.0 |
| | tBA | 0.0 | 388.0 | 403.9 |
| Initiator 1 | Vazo 67 | 106.0 | 90.0 | 100.0 |
| Chain transfer agent | MPA | 0.0 | 0.0 | 44.2 |
| | pOM | 21.7 | 70.0 | 0.0 |
| Solvent 2 | BuAc | 221.3 | 224.7 | 220.0 |
| Initiator 2 | Trig (each addition) | 3.5 | 0.0 | 3.5 |

The abbreviations are as for Table 1 with the addition of;
BuAc=Butyl acetate
Solvesso=Solvesso 100; an aliphatic hydrocarbon solvent from Exxon Chemicals.
AA=Acrylic acid
MAA=Methacrylic acid
Card=Cardura E 10
MMA=Methyl methacrylate
Trig=Trigonox 21s 4. Preparation of Polymers 19 and 20

U.S. Pat. No. 4,605,719 exemplifies a superficially similar polymer to those of the invention comprising units derived from isobornyl acrylate and hydroxypropyl acrylate. The experiment below compares a polymer made according to Example 1 of this patent (polymer 19) with an otherwise identical polymer in which the isobornyl acrylate and hydroxypropyl acrylate have been replaced with isobornyl methacrylate and 4-hydroxybutyl acrylate respectively (polymer 20).

In a reaction vessel fitted with a stirrer, a thermometer, an inlet tube for inert gas and a reflux condenser an acrylate resin was prepared by heating a mixture of 2175 parts of solvesso 100 and 103.4 parts of cumene hydroperoxide to reflux temperature (160°–165° C.). To it was added over a period of five hours a mixture of 705 parts of isobornyl acrylate, 705 parts of methyl methacrylate, 1635 parts of butyl acrylate, 373.5 parts of styrene, 72.5 parts of methacrylic acid, 876.2 parts of hydroxypropyl acrylate and 96 parts of tertiary butyl perbenzoate. To the resulting mixture were added 270 parts of solvesso 100. The reaction mixture was kept at reflux temperature for three hours.

An acrylate resin solution of polymer 19 according to U.S. Pat. No. 4,605,719 was obtained having a solids content of 64.3% by weight, an acid number of 11.29, and a hydroxyl number of 82.6.

The above preparation was repeated replacing the isobornyl acrylate with an equal weight of isobornyl methacrylate and the hydroxypropyl acrylate with an equal weight of hydroxybutyl acrylate.

An acrylate resin solution of polymer 20 according to the present invention was obtained having a solids content of 64.7% by weight, an acid number of 12.84, and a hydroxyl number of 74.56.

Colourless clearcoat compositions were prepared by intermixing the acrylate resin solutions prepared above, Tolonate HDT 90 polyisocyanate crosslinker, a 2% solution of dibutyl tin dilaurate in butyl acetate, and butyl acetate. The amounts are set out in Table 2 below (in g).

| | Comparative Composition | Composition according to the Invention |
|---|---|---|
| Polymer solution 19 | 111.63 | 0.00 |
| Polymer solution 20 | 0.00 | 110.93 |
| Butyl Acetate | 17.78 | 18.58 |
| Tolonate HDT 90 | 20.25 | 20.25 |
| DBTDL (2%) | 0.34 | 0.34 |

The compositions were thinned using butyl acetate to a viscosity of 25s BS B4 cup at 20° C. The non-volatile content of the compositions was measured using the method given in 2 above. The non-volatile content of the composition according to the invention was 56.95 and that of the comparative composition was 57.16. Thus the solids of the compositions was almost the same.

The coating compositions were applied by 175 μm block spreader to pre-treated steel panels, and left for 24 hours at ambient temperature at which time their Konig hardness was determined using an Erichsen Hardness tester. The film formed from the comparative composition had a hardness of only 7 seconds whereas the film formed from the composition containing the polymer according to the present invention had a hardness of 27 seconds.

We claim:

1. A high solids paint coating composition containing a film forming coreactive polymeric mixture in a volatile organic solvent, the polymeric mixture comprising:

a hydroxyl functional acrylic addition polymer of 2% to 50% by weight copolymerized isobornyl methacrylate and 10% to 50% by weight 4-hydroxylbutyl acrylate with the balance being other copolymerized ethylenic monomers, the acrylic polymer having a number average molecular weight of 700 to 10,000 as measure by gel permeation chromatography; and a crosslinker adapted to coreact with the hydroxyl functional acrylic addition polymer upon curing to produce a crosslinked film.

2. The high solids paint coating of claim 1 where the acrylic polymer contains 5% to 50% of copolymerized alpha-methyl styrene.

3. The high solids paint coating of claim 1 where the crosslinker is a polyisocyanate.

4. The high solids paint coating of claim 1 where the crosslinker is a melamine formaldehyde resin.

5. The paint coating composition of claim 1 where the acrylic polymer contains copolymerized mercapto alkanoic acid.

6. The paint coating composition of claim 5 where the acid groups from the mercapto alkanoic acid are reacted with a glycidyl ester of tertiary aliphatic carboxylic acid.

7. The paint coating composition of claim 5 where the mercaptoalkanoic acid is mercapotopropionic acid.

8. A paint coating composition adapted to coreact upon curing to produce a crosslinked paint film, the paint coating comprising an acrylic film forming polymer of a hydroxyl functional addition polymer of 5% to 50% by weight copolymerized isobornyl methacrylate, 10% to 50% by weight copolymerized 4-hydroxybutyl acrylate, with balance being other copolymerized ethylenic monomers, the acrylic polymer having a number average molecular weight of 700 to 10,000 as measured by gel permeation chromatography, where the coating composition contains a crosslinking agent adapted to coreact with the hydroxyl functional acrylic polymer upon curing.

* * * * *